United States Patent
Moir

(10) Patent No.: US 7,251,682 B2
(45) Date of Patent: Jul. 31, 2007

(54) WEB BROWSER SYSTEM

(75) Inventor: Mark Moir, Waterbeach (GB)

(73) Assignee: Pace Micro Technology Plc, Saltaire, Shipley (GB)

( * ) Notice: Subject to any disclaimer, the term of this patent is extended or adjusted under 35 U.S.C. 154(b) by 758 days.

(21) Appl. No.: 10/264,156

(22) Filed: Oct. 3, 2002

(65) Prior Publication Data

US 2003/0067484 A1   Apr. 10, 2003

(30) Foreign Application Priority Data

Oct. 4, 2001   (GB) .................................. 0123793.2

(51) Int. Cl.
    *G06F 15/16*   (2006.01)
(52) U.S. Cl. ...................... 709/217; 709/226; 709/229; 455/3.03; 719/330
(58) Field of Classification Search ................ 709/217, 709/226, 229; 455/3.03; 719/330
    See application file for complete search history.

(56) References Cited

U.S. PATENT DOCUMENTS

| | | | |
|---|---|---|---|
| 5,646,608 A * | 7/1997 | Shintani ................ 340/825.52 |
| 6,330,719 B1 * | 12/2001 | Zigmond et al. ........... 725/121 |
| 6,714,222 B1 * | 3/2004 | Bjorn et al. ................. 715/839 |
| 6,874,152 B2 * | 3/2005 | Vermeire et al. ........... 719/330 |
| 6,909,378 B1 * | 6/2005 | Lambrechts et al. ... 340/825.22 |
| 6,938,101 B2 * | 8/2005 | Hayes et al. ................... 710/5 |
| 7,082,254 B1 * | 7/2006 | Rashkovskiy et al. ......... 386/83 |
| 2001/0044855 A1 * | 11/2001 | Vermeire et al. ........... 709/310 |

\* cited by examiner

*Primary Examiner*—Saleh Najjar
*Assistant Examiner*—Liang-che Wang
(74) *Attorney, Agent, or Firm*—Head, Johnson & Kachigian

(57) ABSTRACT

A broadcast data receiver (BDR) is provided with a web browser system. A service provided by the web browser system si selectable by a user of the BDR and, when selected, is controllable by the user via a remote control handset, thereby allowing an Internet web site page for display on a display screen connected to or forming part of the BDR to be determined and one or more user options can be selected if required. One or more icons are generated on at least a portion of the display screen and each of the icons represents a button on the remote control handset. Each icon is mapped to a specific control function or option of the web browser, thereby allowing user selection of a web browser control function or option by selection of the appropriate button on the remote control handset.

10 Claims, 2 Drawing Sheets

WEB BROWSER SYSTEM

CROSS-REFERENCE TO RELATED APPLICATION

This is an United States Application entitled "Web Browser System" claiming priority to British Application No. 0123793.2 filed 4 Oct. 2001.

BACKGROUND OF THE INVENTION

The invention to which the application relates is a web browser system for use in obtaining and selecting internet web sites via a web browser. The system of the present invention is particularly, although not necessarily exclusively, related to the use of a web browser system as part of a service offered via a broadcast data receiver (BDR).

A BDR is typically connected to or provided as part of a television display screen and is used to receive data from a broadcaster at a remote location via cable, satellite and/or terrestrial broadcast systems. The BDR processes the received data and generates video and audio therefrom, typically to represent television programs, as well as providing other services such as web browser facilities using external communications for display on the television display screen and/or for listening to via speakers.

Web browser services are well known and are known to be provided via broadcast data receivers (BDRs). A difference between personal computer (PC) based and BDR based web browsers is that, due to the reduced definition of the television display screens used to display the web sites with BDR services, the entire screen is typically taken up by a single web site page only and the means of selecting a new Internet web page is typically via a remote control device provided with the television system. Thus, currently, when using a BDR with a web browser, there is no mouse by which a user can control a pointer icon on the television display screen to allow selection of active links on a web page. Instead, television systems typically use a highlighted portion that is moved around the web page using the arrow keys on the remote control, and, by pressing the 'Select' button on the remote control device, the user chooses the particular link indicated by the highlight portion. However, problems with the conventional system are that it is clumsy and slow for the user to use and difficult to implement logically.

A conventional means for selecting links on a teletext system of a television includes the provision of colored buttons on the remote control handset which correspond to color coded subject matter on the teletext page. When one of the colored remote control buttons is depressed, the corresponding colored link on the teletext page is viewable by the user, thereby providing quick access to a linked page in the teletext system. For example, a teletext page relating to football might have red=next story, green=tables, yellow=sport, blue=results. Rather than having to keep going back to a menu page to select a new page for viewing, the user can press one of the colored buttons to access the page directly from the page they are viewing.

The coloured coded links and keys are specified by the service provider (such as BBC, SKY, ITV and/or the like) and the colour coded buttons merely provide a way in which the user can follow the most likely taken path to the next teletext page. As such, the links to which the colour coded buttons relate cannot be changed once specified by the service provider, only allow a maximum of four possible links and do not interact with the page. The conventional teletext rapid selection means is therefore of only limited use.

The aim of the present invention is to provide a web browser system having means for selection of web page links or user selectable options in addition to, or as an alternative to a conventional highlighting system and which overcomes the abovementioned problems.

SUMMARY OF THE INVENTION

In a first aspect of the present invention there is provided a web browser system for a broadcast data receiver (BDR) to allow the generation of internet site displays on a connected display screen, a service provided by the web browser system selectable by a user of the BDR and, when selected, controllable by the user via a remote control device so that a selected Internet web site page can be determined, said page including one or more user options to be selected if required, and characterized in that one or more icons are generated on the display screen, each of said icons representing a key on the remote control device and each icon being mapped to a specific control function of the web browser actionable upon user selection of said user option by selection of the appropriate key on the remote control device matching the displayed icon for the required user option.

Typically, upon the display of a newly selected Internet web site page, the one or more icons are displayed with respect to available user options for that page. In one embodiment the icons are displayed in a grouped manner say, for example, if there are 10 icons, the same are displayed with respect to the first 10, last 10 or middle 10 user options or other defined grouping. Alternatively, the display of the icons can be selected to be with reference to specific subject matter options and therefore may be interspersed amongst the user options available. In each case it can be linked to the HTML tags.

The icons can be mapped to the one or more user options and/or control functions of the web browser.

Preferably the icon display can be selectively shown on the display screen by user selection of an appropriate icon display option via a display screen menu. Alternatively, when the user has a web page displayed, they can select a dedicated button on the remote control which will switch the icon selection option on or off. Thus, when the icon selection option is switched on, the required number of icon indicators on the web page are displayed in such a manner so as to show that they are linked to a user selectable option on the page.

Preferably an icon is displayed next to a link which will be selected/invoked if that icon is selected.

In one embodiment, one or more of the numbered digit buttons/keys of the remote control, i.e. 0-9, are indicated by the icons, and, upon selection of a numbered button on the remote control and transmission of the signal to the BDR, the selection of the option or control function indicated by that numbered icon on the display screen is made via the receiver web browser function. If a remote control is provided with a greater number of numbered buttons than 0-9, then the icons can represent all or some of these greater number of buttons.

Typically, the user can move or 'toggle' the display of the icons on the web page which represent the numbers 0-9 on the remote control handset, such that if there are more than nine functions or options on the display page, the icons can be moved by the user to allow the icons to be linked with other functions or options which previously had no icon linked thereto. Once the icon or icons are moved, if the user then presses any of the numbered remote control buttons, the new links that they represent will be invoked. Thus, for example, the options provided with icon links on a web page can be spaced through a plurality of possible links on the page displayed.

Preferably the user moves the icons to different options by selecting a pre designated button on the remote control handset.

In one embodiment the icons can move to any of the next nine (or required number of) available consecutive options on the web page, the next nine (or required number of) options which are linked in relevancy, the next nine (or required number of) options which form a set on the display screen and/or the like. The set can be composed of user selectable options relating to subject matter, time, space, position, alphabetical order, chronological order and/or the like.

Once the user has made a selection of an option from a web page using an appropriate icon selection, a new web page is typically displayed on the display screen, and the one or more icons are linked to user selectable options on this new web page.

Another aspect of the present invention is a method of using a web browser system for a BDR.

The present invention therefore has the advantage that is provides a fast link function which allows a user to quickly and easily make selections from an Internet web page. The icons linked to the user selectable options on the web page are also user selectable, in that firstly the provision of the icons can be switched on or off by the user, and secondly the options to which the icons are linked on the page can be changed and/or moved by the user to allow linking to further options on the page which previously had no icons linked thereto.

Thus, it can be seen that the present invention differs from conventional icon linked displays, such as colored remote control buttons used in teletext display pages, in that the present invention allows direct user selectable icon linking of web page selectable options. Conventionally, the options linked to the colored remote control buttons are determined by the service provider and are part of the screen syntax. As such, the linked options can not be changed or moved by the user and are therefore of only limited use. In addition, conventional systems cannot be switched on/off by the user and are not interactive

DESCRIPTION OF THE DRAWINGS

A specific embodiment of the invention is now described with reference to the accompanying drawings, wherein:—

DESCRIPTION OF THE PREFERRED EMBODIMENTS

Figure 3:
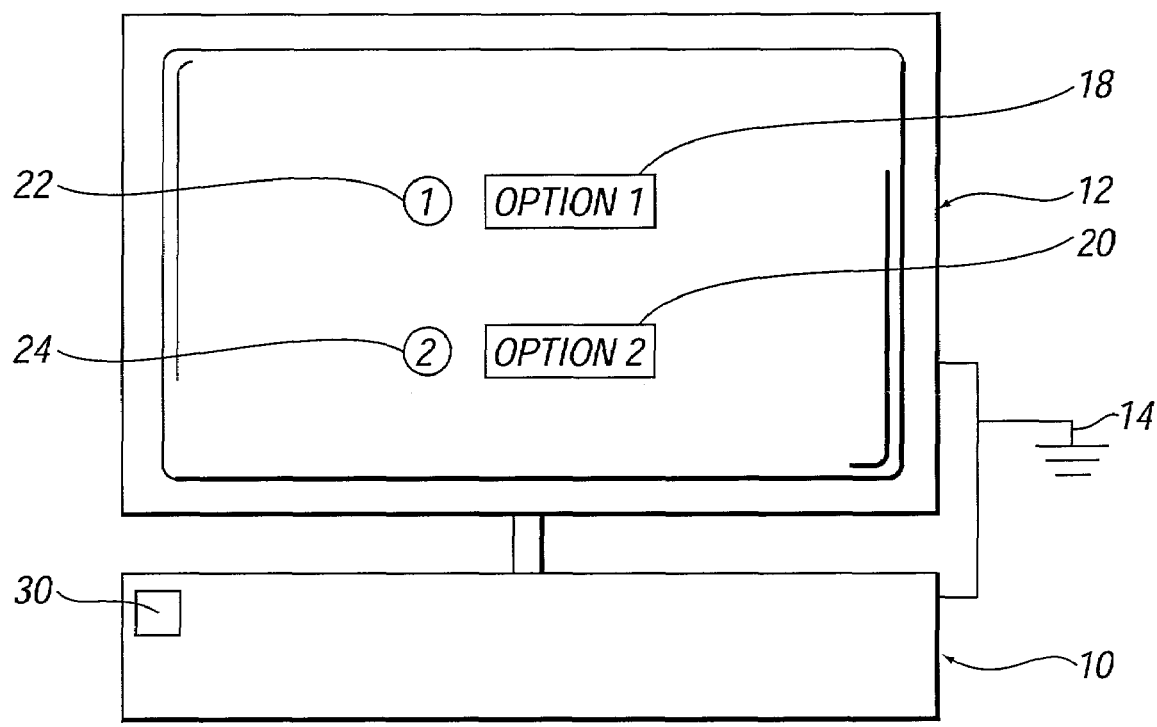
FIG. 3 illustrates a further embodiment of the present invention.
Figure 3:
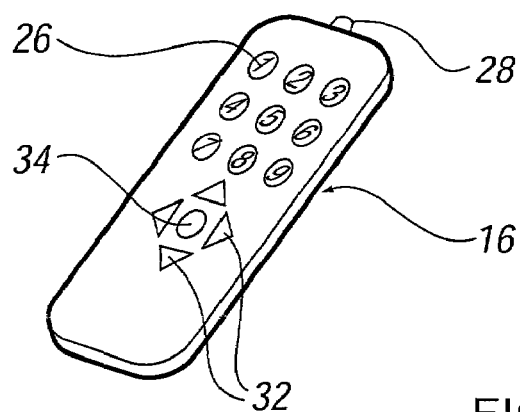

Referring firstly to FIG. 3, there is illustrated a BDR 10 connected to a television display screen 12, both of which are connected to a mains power supply 14. A remote control handset 16 is provided for allowing user selection of a plurality of functions and operations of the television display screen 12 and/or BDR 10.

In accordance with the present invention, a web browser service is available for selection via the BDR. An Internet web page displayed on the display screen 12 typically contains a number of user selectable options 18, 20. A fast link function is available for selection by the user to allow the options 18, 20 to be quickly and easily selected by the user in addition to, or as an alternative to selection using a conventional highlighting method.

Figure 1:
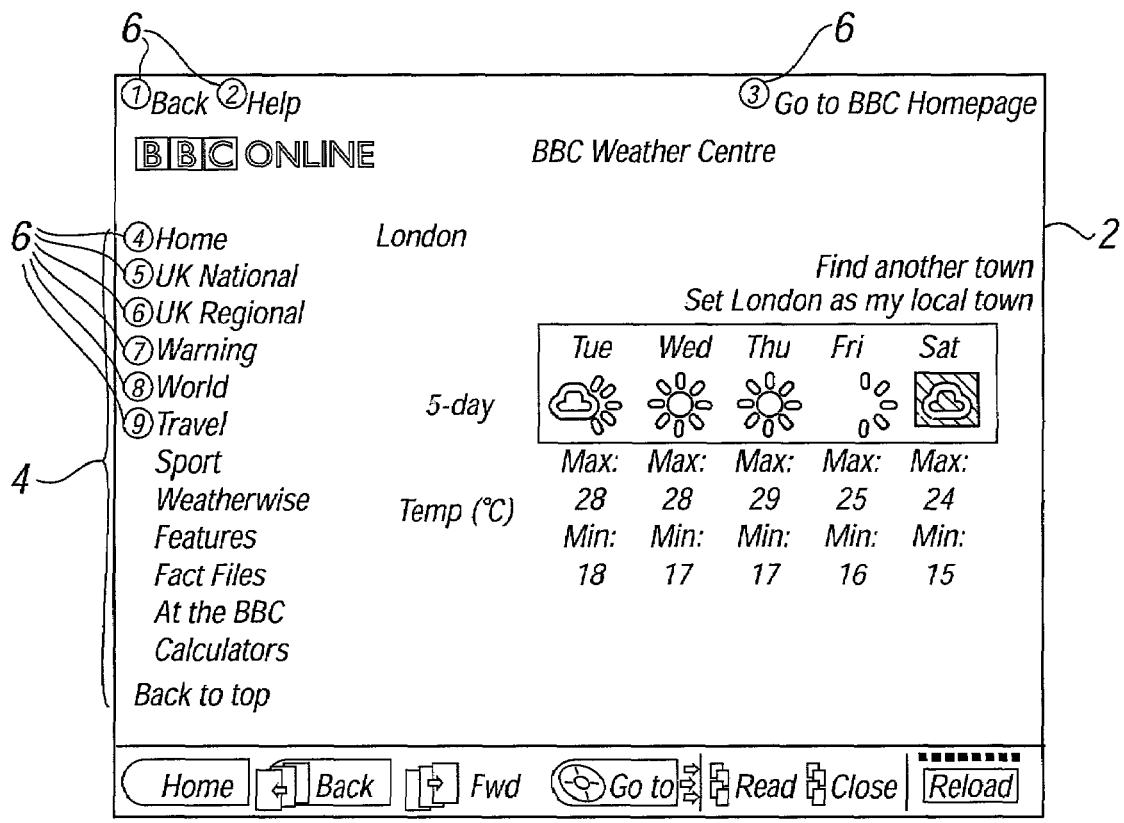
FIG. 1 illustrates a first embodiment of the display.

The fast link function comprises a number of icons 22, 24 which are displayed adjacent the options 18, 20 to which they are linked. In the example given in FIG. 1, the icons 22, 24 are in the form of numbers, the numbers matching the corresponding numbered buttons on the remote control handset 16. Thus, if a user wishes to select option 1 (18) from the display page, the user depresses numbered button 1 (26) on the remote control handset. This sends a signal via the Infra red (IR) transmitter 28 on the handset 16 to the IR receiver 30 on the BDR. The BDR processes this signal and makes the appropriate selection of option 1. A similar method takes place if option 2 is required for selection by the user, but in this case numbered button 2 on the remote control handset is depressed by the user.

Figure 2:
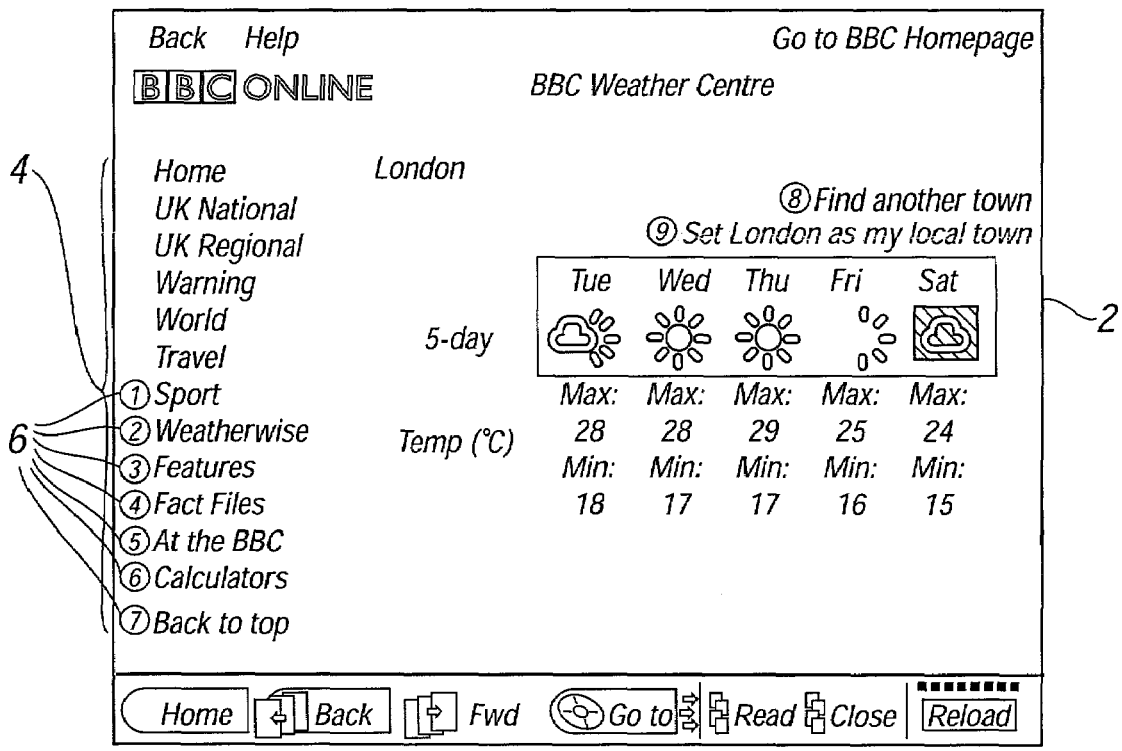
FIG. 2 illustrates a second embodiment of the invention.

Referring to FIGS. 2 and 3, a more detailed example of the present invention is illustrated using a display page from the BBC weather internet site, the said page having been selected by a user for display. The web page includes a number of options 4, each of which conventionally is selectable by the user by moving a highlighted portion about the screen to a position over the required option using the arrow keys 32 on the remote control handset 16. When the highlighted portion is in the correct location on the display screen (i.e. is highlighting an option which the user wishes to select) the user can press the "select" button 34 on the remote control 16 to select the required option.

The conventional method described above can typically still be utilized but, in accordance with the invention, there is an alternative and faster option selection method whereby selected options on the display are allocated an icon 6, each icon, in this embodiment, representing one of the numbered 1-9 buttons on the remote control 16.

As an example, at the top of FIG. 2 there are the selectable options "Back", "Help" and "Go to BBC Homepage". Next to each of these options is an icon 6 with a remote control button number inside. In a column on the left hand side of the page are the selectable options "Home", "UK National", "UK Regional", "Warning", "World", "Travel" and each has a different icon number next to them.

If the user press any of the buttons numbered 1-9 on the remote control handset when numbered icons are displayed on the display screen 2, the option or link that an icon is allocated to and shown next to, is selected by the BDR.

The button icons can be split into different option or link portions, as shown in FIG. 2, where all but one numbered icon is allocated to a first portion of links, with the remaining numbered icon allowing selection of options not in the allocated portion. The numbered icons can be moved to allow reallocation of the icons to links or options in other portions of the display page not previously provided with an icon link, thereby allowing a number of options on the display page to be referred to by a single icon. Thus, when the icon display is switched on by the user, the icons are dynamically allocated to the most popularly selected options or option portion of the display screen. If a user then wishes to select an option which has not been allocated an icon when the icon display was switched on, typically because it was deemed to be a less popular option, the icon or icons can be moved by the user on selection of an appropriate button on the remote control handset.

Thus, the user of the present invention can cycle through a limitless number of links on a web page by subsequent depression of a dedicated remote control handset. Each depression of the dedicated button moves the 1-9 icons onto the next set of links on the web page. A smart engine (an item of hardware or software which dynamically adapts to the signals received by the BDR) in the BDR typically calculates the next nine most likely selected options for linking with the icons on depression of the dedicated button. The next nine most likely selected options can be calculated on a frame by frame basis, table by table basis or via a top-left to bottom-right position basis on the display screen.

In one embodiment the user can have their own web pages customized to define exactly which buttons on the remote control will be matched with which user selectable option on the web page. This embodiment is typically provided for by using HTML "fastlink" commands as described below.

Thus, a further feature of the present invention is the introduction of special HTML tags into the graphical interface, so that rather than the icons being allocated to the first listed links on a web page, the tags denote which of the links on the web page should be indicated by the icons. This could be used so that the links which are less used by users are not initially indicated with an icon. An example of the HTML tags might be:

<A HREF="news.html" FASTLINK=1>World news</A>
<A HREF="sport.html" FASTLINK=2>Sports news</A>

The FASTLINK tags typically override any default system which finds the links for the user and web page author, i.e., as provided by a smart engine.

Thus, the present invention provides a selection method in addition to, or as an alternative to the complex and sometimes confusing highlight system, so that web pages can be surfed with a minimum of remote control key operations being required to be performed by the user.

The buttons which control the fast links on the web page can be assigned to other user controlled devices so that the system can be integrated into standalone point of information booths or adapted for people with disabilities.

The present invention provides a means of directly linking icons with selectable options, thereby allowing the icons to follow a subject or line of relevancy relating to the options that are being selected via the icons. For example, a web page may provide a link to the latest James Bond Film. On selection of this option, a further option is displayed which may be the name of the actor in James Bond, Pierce Brosnan. Selection of this name could result in a link to a film career or fan page web site. This web page may in turn have a link to another film in which Pierce Brosnan has played a role in called the "Thomas Crown Affair". The selectable options which have some associated relevance to a previous selection are likely to be allocated to being linked to the icons, thereby providing a fast link method of navigating through a plurality of web pages. Thus, up to nine options on a web page at any one time are available for following quickly.

The icons on the display screen can be displayed as a layer in the HTML or as part of a graphics display layer which is transparent other than for the icons, thereby allowing the icons in one layer and the options in another graphics layer to be viewable simultaneously. Superimposed icons have the advantage that they do not interfere with the layout of the actual web page.

The smart engine of the present invention which allows the linking of the icons to selectable options on a web page functions as follows:
1. Based on a pre-defined hierarchy of frames vs tables vs straight HTML, the HTML in the web page is searched to find <FORM> and <A HREF> tags.
2. The first nine options in the list are set to be the first set of icon links.
3. The page is rendered, with the icon link positions being stored in memory.
4. The icons are generated on a separate layer or graphics plain in the same position as the stored link positions, thereby allowing the pages to be scrolled with the layer.
5. The buttons on the remote control handset are mapped so that the nine numbered keys are linked to the numbered icons on the display screen.
6. If the icon display button on the remote control which controls whether the icons are displayed or hidden is subsequently pressed, the icons can either be moved to new options on the web page or be removed from view on the web page.

Thus, the present invention provides a means of assigning short cuts to a dynamic user interface for an Internet web page facility provided via a broadcast data receiver.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. A web browser system for a broadcast data receiver for generation of internet site displays on a connected display screen, said system comprising:
   a remote control device having a plurality of dedicated buttons;
   a service provided by the web browser system selectable and controllable by a user via the remote control device to select an internet web site page having one or more user options being generated on the display screen;
   a user selecting an icon display option while the web site page is displayed having fast linking means providing a plurality of user selected icons, the user selected icons being displayed adjacent to the user options, the plurality of user selected icons selectively corresponding with the plurality of dedicated buttons on said remote control and selectively corresponding with the adjacent user option on the display screen each icon being mapped to a specific function on the web browser, wherein said plurality of user selected icons represent one or more numbered keys on said remote control device; and
   a smart engine means in said broadcast data receiver for linking of the plurality of dedicated buttons on said remote control with the user selected icons and to present an additional number of options for dynamically linking the remaining user options with the user selected icons upon depression of a pre-designated button on said remote control.

2. A web browser system according to claim 1 wherein said user selected icon is displayed next to a mapped control function on the web page.

3. A web browser system according to claim 2 wherein the control functions to which said user selected icons are mapped are spaced throughout a plurality of control functions available for selection on the web page.

4. A web browser system according to claim 2 wherein once a control function is selected via selection of a mapped user selected icon and a new web page is displayed, the plurality of user selected icons are provided on the new web page.

5. A web browser system according to claim 2 wherein said icons are allocated to the most commonly selected control function on the web page.

6. A web browser system according to claim 2 wherein the one or more plurality of user selected icons can be mapped to specific control functions selected by the user.

7. A web browser system according to claim 6 wherein said plurality of user selected icons are mapped to specific control functions via introduction of HTML tags into graphical interface associated with those control functions.

8. A web browser system according to claim 2 wherein said plurality of user selected icons are provided as part of a graphics display layer, the graphics layer being substantially transparent apart from the icons.

9. A web browser system according to claim 1 wherein said user selected icon is or includes the number of the key which it represents on the remote control device.

10. A web browser system according to claim 1 wherein said one or more plurality of user selected icons are moved to the next consecutive available control functions on the web page, the next available control functions on the web page linked to the relevancy of the previous mapped control functions, or the next available control functions which form a pre-specified set on the display screen.

* * * * *